US012640923B2

(12) United States Patent (10) Patent No.: US 12,640,923 B2
Takbiri et al. (45) Date of Patent: May 26, 2026

(54) NUMBER-THEORETIC TRANSFORM ARCHITECTURE FOR LATTICE-BASED CRYPTOGRAPHIC ALGORITHMS

(71) Applicant: Microsoft Technology Licensing, LLC, Redmond, WA (US)

(72) Inventors: Nazanin Takbiri, San Jose, CA (US); Jay Scott Fuller, Scotts Valley, CA (US); Patrick Darwin Longa Pierola, Redmond, WA (US); Michiel Tom J Van Beirendonck, Antwerp (BE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 6 days.

(21) Appl. No.: 18/627,200

(22) Filed: Apr. 4, 2024

(65) Prior Publication Data

US 2025/0317291 A1 Oct. 9, 2025

(51) Int. Cl.
 H04L 9/30 (2006.01)
(52) U.S. Cl.
 CPC ................................. H04L 9/3093 (2013.01)
(58) Field of Classification Search
 CPC ...................................................... H04L 9/3093
 USPC .......................................................... 380/28
 See application file for complete search history.

(56) References Cited

U.S. PATENT DOCUMENTS

| | | | | |
|---|---|---|---|---|
| 2020/0265167 A1* | 8/2020 | Banerjee | ............... | H04L 9/0631 |
| 2021/0073316 A1* | 3/2021 | Ulrich | ........................ | G06F 5/01 |
| 2025/0147732 A1* | 5/2025 | Parhi | ........................ | G06F 7/722 |
| 2025/0202701 A1* | 6/2025 | Ahn | ........................ | H04L 9/008 |

OTHER PUBLICATIONS

Chen, et al., "CFNTT: Scalable 1-20 Radix-2/4 NTT Multiplication Architecture with an Efficient Conflict-free Memory Mapping Scheme", IACR Transactions on Cryptographic Hardware and Embedded Systems, vol. 2022, No. 1, Nov. 19, 2021, pp. 94-126.
Garrido, et al., "Pipelined radix-2k feedforward FFT architectures", IEEE Transactions on Very Large Scale Integration (VLSI) Systems, vol. 21, Issue No. 1, 2011, 10 pages.
International Search Report and Written Opinion received for PCT Application No. PCT/US2025/016172, mailed on Jun. 2, 2025, 15 pages.
Kaya, et al., "Memory-based FFT architecture with optimized number of multiplexers and memory usage", IEEE Transactions on Circuits and Systems II: Express Briefs, vol. 70, Issue No. 8, Aug. 2023, pp. 3084-3088.

(Continued)

*Primary Examiner* — Michael S McNally

(57) ABSTRACT

Examples are disclosed that relate to number-theoretic-transform (NTT) architectures and inverse NTT (INTT) architectures for module lattice-based cryptographic algorithms. One example provides a device for performing an NTT for lattice-based cryptographic algorithms. The device comprises a memory block, a read address permutation generator configured to read input values from the memory block, a commutator stage comprising a first commutator layer of commutators and a second commutator layer, a butterfly stage connected to output of the commutator stage, and a write address permutation generator configured to write output values to the memory block.

20 Claims, 9 Drawing Sheets

(56) References Cited

OTHER PUBLICATIONS

Mert, et al., "An extensive study of flexible design methods for the number theoretic transform", IEEE Transactions on Computers, vol. 71, Issue No. 11, 2020, 15 pages.
Zhao, et al., "Design of an Efficient NTT/INTT Architecture With Low-Complex Memory Mapping Scheme", IEEE Transactions on Circuits and Systems II: Express Briefs, vol. 71, No. 1, Jan. 2024, pp. 400-404.

* cited by examiner

700

| VALUES OF DEPTH AT DIFFERENT COMMUTATOR LAYERS FOR NTT | | | | | |
|---|---|---|---|---|---|
| ALGORITHM | ITERATION | DEPTH_00 | DEPTH_01 | DEPTH_10 | DEPTH_11 |
| DILITHIUM | ITERATION 1 | 8 | 4 | 2 | 1 |
| | ITERATION 2 | 8 | 4 | 2 | 1 |
| KYBER | ITERATION 1 | 8 | 4 | 2 | 1 |
| | ITERATION 2 | 4 | 2 | 1 | 0 |

702      704      706      708      710      712

800

| VALUES OF DEPTH AT DIFFERENT COMMUTATOR LAYERS FOR INTT | | | | | |
|---|---|---|---|---|---|
| ALGORITHM | ITERATION | DEPTH_00 | DEPTH_01 | DEPTH_10 | DEPTH_11 |
| DILITHIUM | ITERATION 1 | 2 | 1 | 8 | 4 |
| | ITERATION 2 | 2 | 1 | 8 | 4 |
| KYBER | ITERATION 1 | 1 | 0 | 4 | 2 |
| | ITERATION 2 | 2 | 1 | 8 | 4 |

802      804      806      808      810      812

900

| READ AND WRITE ADDRESS FORMULA GENERATOR | | | | | |
|---|---|---|---|---|---|
| ALGORITHM | ITERATION | NTT READ | NTT WRITE | INTT READ | INTT WRITE |
| DILITHIUM | ITERATION 1 | 230154 | 543210 | 543210 | 230154 |
|  | ITERATION 2 | 230154 | 543210 | 543210 | 230154 |
| KYBER | ITERATION 1 | 23014 | 43210 | 43210 | 12043 |
|  | ITERATION 2 | 12043 | 43210 | 43210 | 23014 |

902     904    906    908

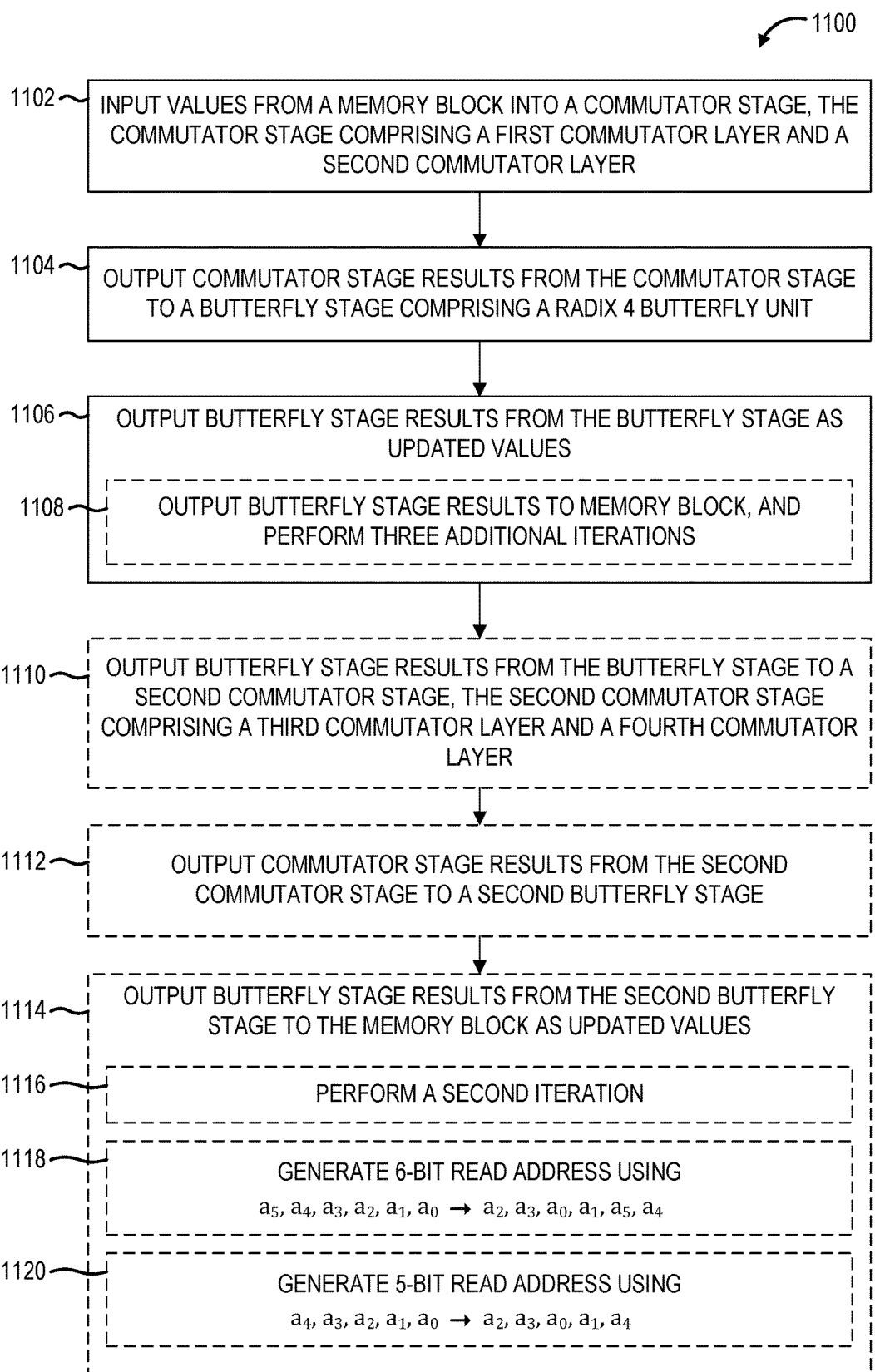

1100

1102 — INPUT VALUES FROM A MEMORY BLOCK INTO A COMMUTATOR STAGE, THE COMMUTATOR STAGE COMPRISING A FIRST COMMUTATOR LAYER AND A SECOND COMMUTATOR LAYER

1104 — OUTPUT COMMUTATOR STAGE RESULTS FROM THE COMMUTATOR STAGE TO A BUTTERFLY STAGE COMPRISING A RADIX 4 BUTTERFLY UNIT

1106 — OUTPUT BUTTERFLY STAGE RESULTS FROM THE BUTTERFLY STAGE AS UPDATED VALUES

1108 — OUTPUT BUTTERFLY STAGE RESULTS TO MEMORY BLOCK, AND PERFORM THREE ADDITIONAL ITERATIONS

1110 — OUTPUT BUTTERFLY STAGE RESULTS FROM THE BUTTERFLY STAGE TO A SECOND COMMUTATOR STAGE, THE SECOND COMMUTATOR STAGE COMPRISING A THIRD COMMUTATOR LAYER AND A FOURTH COMMUTATOR LAYER

1112 — OUTPUT COMMUTATOR STAGE RESULTS FROM THE SECOND COMMUTATOR STAGE TO A SECOND BUTTERFLY STAGE

1114 — OUTPUT BUTTERFLY STAGE RESULTS FROM THE SECOND BUTTERFLY STAGE TO THE MEMORY BLOCK AS UPDATED VALUES

1116 — PERFORM A SECOND ITERATION

1118 — GENERATE 6-BIT READ ADDRESS USING $a_5, a_4, a_3, a_2, a_1, a_0 \rightarrow a_2, a_3, a_0, a_1, a_5, a_4$

1120 — GENERATE 5-BIT READ ADDRESS USING $a_4, a_3, a_2, a_1, a_0 \rightarrow a_2, a_3, a_0, a_1, a_4$

FIG. 11

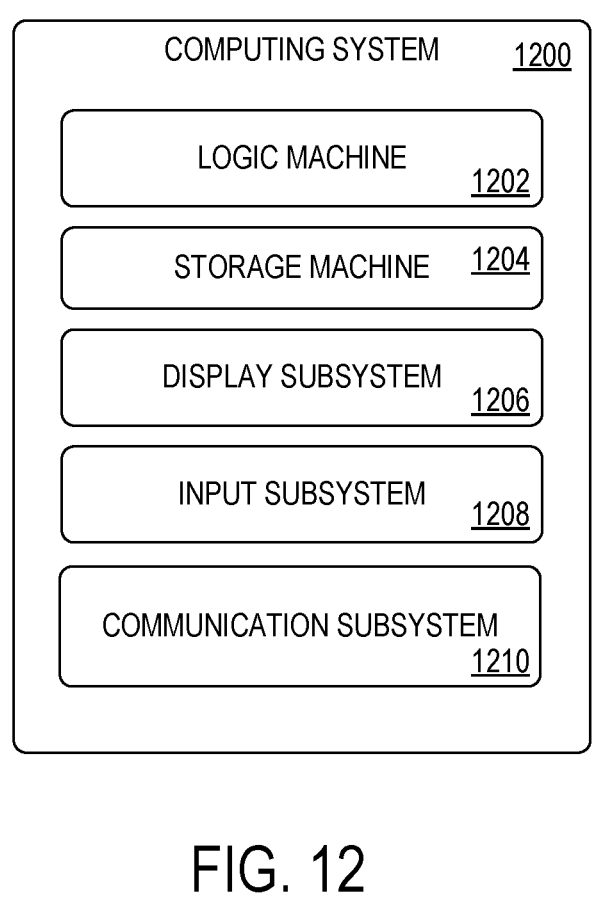

COMPUTING SYSTEM 1200

LOGIC MACHINE 1202

STORAGE MACHINE 1204

DISPLAY SUBSYSTEM 1206

INPUT SUBSYSTEM 1208

COMMUNICATION SUBSYSTEM 1210

FIG. 12

NUMBER-THEORETIC TRANSFORM ARCHITECTURE FOR LATTICE-BASED CRYPTOGRAPHIC ALGORITHMS

BACKGROUND

Some widely used cryptographic systems rely on asymmetric cryptographic algorithms that utilize pairs of related keys. These cryptographic algorithms can be used for key encapsulation and digital signatures. Key pairs are generated using algorithms based on so-called "one-way" mathematical functions. A one-way mathematical function is a function that is relatively easy to evaluate, but inverting the function is computationally complex. Examples include the integer factorization problem, the discrete logarithm problem, and the elliptic-curve discrete logarithm problem. Using a one-way mathematical function, a public key can be easily generated from a private key. In contrast, deciphering a private key from a public key is extremely computationally expensive on conventional computers. However, quantum computing is an area of active research, and quantum computers eventually may be able to compromise public-key cryptographic algorithms. As such, there has been recent effort to develop post-quantum cryptographic algorithms that are resistant to attack by quantum computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to number-theoretic-transform (NTT) architectures for module lattice-based cryptographic algorithms. One example provides a device for performing an NTT for lattice-based cryptographic algorithms. The device comprises a memory block, a read address permutation generator configured to read input values from the memory block, a commutator stage comprising a first commutator layer of commutators and a second commutator layer, a butterfly stage connected to output of the commutator stage, the butterfly stage comprising a radix-4 butterfly unit, and a write address permutation generator configured to write output values to the memory block.

BRIEF DESCRIPTION OF THE DRAWINGS

FIG. 11 shows a flow diagram of an example method for performing an NTT computation.

FIG. 12 shows a block diagram of an example computing system.

DETAILED DESCRIPTION

Figure 1:
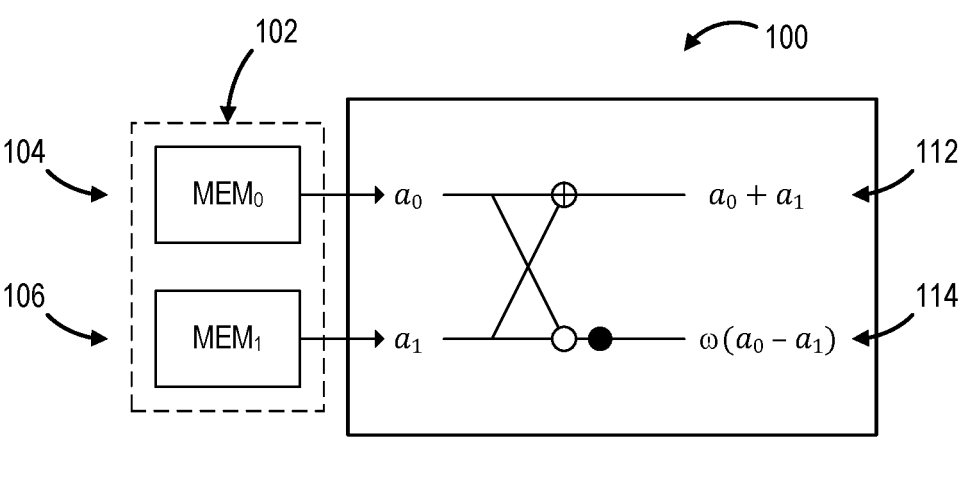
FIG. 1 schematically shows an example radix-2 butterfly unit that can be used in a Number Theoretic Transform (NTT) computation.

In recent years, there has been a substantial amount of research on quantum computers—machines that exploit quantum mechanical phenomena to solve mathematical problems that are difficult or intractable for conventional computers. As discussed above, quantum computers may be able to break public-key cryptographic systems that are currently in use. This could compromise the confidentiality and integrity of digital communications on the Internet and elsewhere. As such, there also has been much recent effort to develop post-quantum cryptographic systems. Post-quantum cryptography (also called quantum-resistant cryptography) refers to cryptographic systems that are secure against attack by both quantum and classical computers, and can interoperate with existing communications protocols and networks.

One approach for post-quantum cryptography is the development of lattice-based cryptographic schemes. Lattice-based cryptography is a generic term for constructions of algorithms used to build cryptographic protocols based on lattices. Examples of lattice-based cryptographic schemes include schemes based on the Shortest Vector Problem (SVP) problem, the Shortest Integer Solution (SIS) problem, the Learning With Errors (LWE) problem, and the Ring Learning With Errors (RLWE) problem. More specific examples of lattice-based cryptographic schemes include CRYSTALS-Kyber (also referred to as Kyber) and CRYSTALS-Dilithium (also referred to as Dilithium). The security of Kyber derives from the difficulty of solving the Module Learning With Errors (MLWE) problem. Similarly, the security of Dilithium is based on the hardness of the Module Learning With Errors (MLWE) and the Module Shortest Integer Solution (MSIS) problems. These problems are variants of the generic LWE and SIS problems, adapted to module lattices for improved efficiency. The Kyber algorithm utilizes a 12-bit prime modulus, whereas Dilithium utilizes a 23-bit prime modulus.

The CRYSTALS-Kyber cryptographic scheme is a key-encapsulation mechanism (KEM). A KEM is a set of algorithms that can be used by two parties to establish a shared secret key over a public channel. A shared secret key that is securely established using a KEM can then be used with symmetric-key cryptographic algorithms to perform basic tasks, such as encryption and authentication. Recently, the National Institute of Standards and Technology (NIST) selected the CRYSTALS-Kyber algorithm for general encryption and finalized the module-lattice KEM (ML-KEM) based on CRYSTALS-Kyber as a cryptographic standard. For more information, see, e.g., National Institute of Standards and Technology (2023) Module-Lattice-based Key-Encapsulation Mechanism Standard. (Department of Commerce, Washington, D.C.), Federal Information Processing Standards Publication (FIPS) NIST FIPS 203 ipd. doi.org/10.6028/NIST.FIPS.203.ipd; and Robert Avanzi, Joppe Bos, Ldo Ducas, Eike Kiltz, Tancrède Lepoint, Vadim Lyubashevsky, John M. Schanck, Peter Schwabe, Gregor Seiler, and Damien Stehlé. CRYSTALS-Kyber algorithm specifications and supporting documentation. Third-round submission to the NIST's post-quantum cryptography standardization process, 2020. csrc.nist.gov/projects/post-quantum-cryptography/round-3-submissions. ML-KEM is believed to be secure against attack by a quantum computer.

The CRYSTALS-Dilithium cryptographic scheme is a digital signature scheme. Digital signatures are used to detect unauthorized modifications to data and to authenticate the identity of the signatory. Additionally, the recipient of signed data can use a digital signature as evidence in demonstrating to a third party that the signature was generated by the claimed signatory. This is known as non-repudiation since the signatory cannot easily repudiate the signature at a later time. Recently, the National Institute of Standards and Technology (NIST) selected the CRYSTALS-Dilithium algorithm for digital signatures and finalized the module-lattice digital signature algorithm (ML-DSA) based on CRYSTALS-Dilithium as a cryptographic standard (see, e.g., National Institute of Standards and Technology (2023) Module-Lattice-based Digital Signature Standard. (Department of Commerce, Washington, D.C.), Federal Information Processing Standards Publication (FIPS) NIST FIPS 204 ipd. doi.org/10.6028/NIST.FIPS.204.ipd). The NIST standards for ML-DSA is derived from a version of the CRYSTALS-Dilithium scheme (referred to as "Dilithium" herein) (Shi Bai, Léo Ducas, Eike Kiltz, Tancrède Lepoint, Vadim Lyubashevsky, Peter Schwabe, Gregor Seiler, and Damien Stehlé. CRYSTALS-Dilithium: Algorithm specifications and supporting documentation (Version 3.1), 2021. pq-crystals.org/dilithium/data/dilithium-specifcation-round3-20210208.pdf). ML-DSA is believed to be secure against attack by a quantum computer.

However, implementing post quantum cryptographic schemes can add computational cost. For example, in a typical encryption scenario, a lattice-based cryptographic system can have increased runtime compared to a non-quantum safe method. Further, lattice-based cryptographic systems can exhibit greater energy consumption and use more data overhead. For example, in lattice-based cryptographic schemes based on variations of the RLWE problem (e.g., CRYSTALS-Kyber or CRYSTALS-Dilithium), data is encoded into length-N polynomials p(X) modulo $X^N+1$. One computational bottleneck relates to computing the multiplication (convolution) of two polynomials when N is large (e.g., 64 or greater). The traditional textbook approach to polynomial multiplication uses a number of operations proportional to $N^2$. A more efficient approach can be derived from the convolution theorem. Polynomial multiplications can be computed as $$c(X) = a(x) \cdot b(x) = IFFT(FFT(a) \odot FFT(b))$$

where FFT represents a Fourier transform, IFFT represents an inverse Fourier transform, and $\odot$ represents the coefficient-wise product. As such, polynomial multiplication of a(x) and b(x) can be efficiently computed by computing the coefficient-wise product of the Fourier transforms of a(x) and b(x). The computational complexity of this technique scales as N log N rather than $N^2$.

In lattice-based cryptography, polynomial coefficients are from a finite field and the Number Theoretic Transform (NTT) is used in place of the Fourier transform. Similarly, the inverse Fourier transform is replaced with an Inverse Number Theoretic Transform (INTT). As such, in lattice-based cryptography, polynomial multiplication is performed as $$y = x1 \cdot x2 = INTT(NTT(x1) \odot NTT(x2))$$

where $\odot$ is the coefficient-wise product between the NTT of x1 and the NTT of x2. Here, the complex floating-point arithmetic of the FFT is replaced by modular integer arithmetic of the NTT. In the context of CRYSTALS-Kyber and CRYSTALS-Dilithium, polynomial multiplication modulo $X^N+1$ is performed, and uses negacyclic convolutions with negacyclic NTTs.

Computing the NTT and the INTT accounts for a significant portion of the computational cost in lattice based cryptographic systems. In dedicated hardware architectures for the NTT, the main computation block comprises one or more butterfly units. FIG. 1 schematically shows a radix-2 butterfly unit 100. Radix-2 butterfly unit 100 is configured for a decimation-in-frequency (DIF) NTT. Radix-2 butterfly unit 100 receives input values from memory 102 including a first input value $a_0$ from a first memory block 104 and a second input value $a_1$ from a second memory block 106. As shown in FIG. 1, radix-2 butterfly unit 100 receives two input values ($a_0$, $a_1$) and outputs two output values 112, 114 according to ($a_0+a_1$, $\omega(a_0-a_1)$), where $\omega$ is the twiddle factor. In other examples, a decimation-in-time (DIT) NTT approach can be used.

A radix-2 algorithm for an NTT of length N proceeds in log 2(N) iterations, where each iteration computes $$\frac{N}{2} \text{ radix--2 butterflies.}$$

A radix-4 algorithm for an NTT of length N proceeds in log 4(N) iterations, where each iteration computes $$\frac{N}{4} \text{ radix--4 butterflies.}$$

For a relatively large value of N, it can be challenging to provide correct input values for each butterfly computation. Typically, to access two (or more) pieces of data simultaneously, hardware architectures use a respective two (or more) independent memory blocks. Further, to access multiple pieces of data at arbitrary strides, read/write address permutation generators are included before and after the memory blocks. This can also help avoid bit reversed cost.

Figure 2:
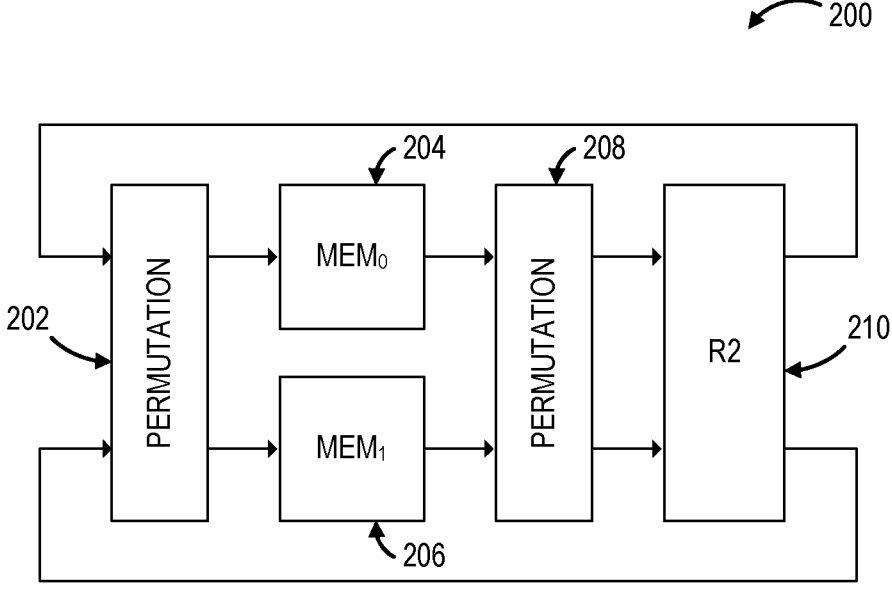
FIG. 2 schematically shows an example NTT architecture comprising two memory blocks, permutation units located before and after the memory block, and a radix-2 butterfly unit.

FIG. 2 schematically shows an example NTT architecture 200 configured for performing NTT computations, and that includes permutation units. NTT architecture 200 comprises a first permutation unit 202, and a memory bank comprising a first memory block 204 and a second memory block 206. NTT architecture 200 further comprises a second permutation unit 208, and a radix-2 butterfly unit 210. First permutation unit 202 is located before the memory blocks and is used for write data permutation. Second permutation unit 208 is located after the memory blocks and is used for read data permutation. Data permutation units permute pieces of data that arrive in parallel.

By using two permutation units, processing elements can receive inputs of values at arbitrary strides. This allows the NTT computation to proceed and avoids data reshuffling and stalls. Further, this can help to avoid bit reverse cost and reduce the memory footprint. The use of two memory blocks can make it easier to read and write data to/from the correct locations. However, additional memory blocks can add cost. Additionally, including multiple memory blocks in an NTT architecture can be an inefficient use of area in a circuit.

Further, as NTT architecture 200 comprises a single radix-2 butterfly unit, an NTT computation can comprise a relatively larger number of iterations than an architecture that uses two or more butterfly units. Additionally iterations can add time and cost, as the NTT computations involve more memory accesses.

Accordingly, examples are disclosed that relate to NTT/INTT architectures which may address the issues described above. Briefly, architectures are disclosed that use a single memory block, and extend the radix-2 implementation to include one or more radix-4 butterfly units. A read/write address generator, as well as one or more commutator stages are used for data permutation. In contrast with other NTT architectures, each commutator stage comprises two commutator layers. The second layer of commutators comprises a varying delay in depths. Read and write address permutation generators are included, and configured for modified read/write address permutation. Further, use of radix-4 butterfly units can help increase throughput and reduce area compared to architectures that employ 2-by-2 (4 total) radix-2 butterfly units.

While radix-4 butterfly units offer advantages over radix-2, radix-4 algorithms involve retrieving four coefficients from memory for inputs. As discussed above, it can be challenging to provide correct inputs for each butterfly unit. Memory addressing issues are further complicated when reducing the memory to a single memory block. To solve these problems, the disclosed example NTT architectures include a commutator stage comprising one or more commutator layers with varying delay in depths. The commutator stage is placed after the memory block. To provide correct inputs in correct order, the commutator layers include delay elements. Additionally, a read address permutation generator is used to retrieve data from correct locations in memory. Examples also are disclosed for architectures comprising two pipelined radix-4 butterfly units with an additional layer of commutators between the radix-4 butterfly units. Compared to traditional NTT architecture, the disclosed examples comprise fewer memory accesses and consume a smaller area in hardware due to the use of a single memory block. Further, the disclosed examples can provide more ordered input and output data than other architectures. This can allow for simpler control logic.

When naively performing the classic decimation-in-time (DIT) NTT and decimation-in-frequency (DIF) INTT, a bit-reversing operation is performed at the beginning of NTT and at the ending of INTT, respectively. The classic DIT NTT receives the input vector in bit-reversed order and produces the output vector in natural order. Thus, the classic DIF INTT is contrary to the orientation of DIT NTT. As such, example NTT architectures are disclosed that avoid the bit-reversed operation for DIT NTT and DIF INTT by employing an algorithm (discussed in more detail below) for generating read addresses and write addresses.

Figure 3:
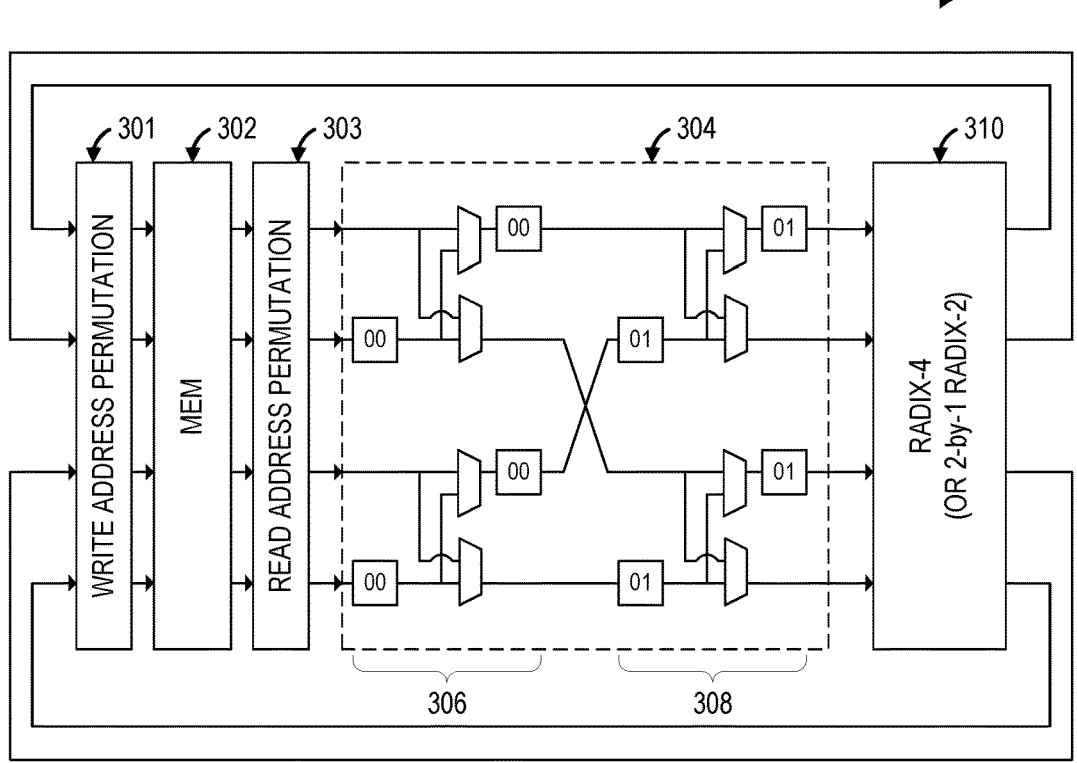
FIG. 3 schematically shows an example NTT architecture adapted for CRYSTALS-Kyber and CRYSTALS-Dilithium, and which comprises a single memory block, two layers of commutators with varying delay in depths, and a radix-4 or 2-by-1 radix-2 butterfly unit based on the chosen algorithm and the iteration being executed.

FIG. 3 schematically shows an example NTT architecture 300 that can provide the advantages discussed above with regard to performance, cost, and area efficiency. NTT architecture 300 can be implemented as a hardware device, and can be used for lattice-based cryptographic schemes, including CRYSTALS-Kyber and CRYSTALS-Dilithium. As such, NTT architecture 300 can be used for ML-KEM and ML-DSA applications.

NTT architecture 300 comprises a write address permutation generator 301, a memory block 302, and a read address permutation generator 303 configured to read input values from the memory block. NTT architecture 300 further comprises a commutator stage 304. Commutator stage 304 comprises a first commutator layer 306 and a second commutator layer 308. NTT architecture 300 further comprises a butterfly stage 310 connected to output of the commutator stage 304. Butterfly stage 310 comprises a radix-4 butterfly unit or a 2-by-1 parallel arrangement of radix-2 butterfly units based on the chosen algorithm and the iteration being executed. Multiplexers can be toggled to control the operation of butterfly stage 310. For example, butterfly stage 310 can operate as a radix-4 butterfly unit for CRYSTALS-Dilithium algorithms. For CRYSTALS-Kyber algorithms, butterfly stage 310 operates as a radix-4 butterfly unit for three passes of data through the architecture, and operates as a 2-by-1 arrangement of radix-2 butterfly units for the fourth pass of data through the architecture. Values output from butterfly stage 310 are output to write address permutation generator 301 for writing to memory block 302.

The example NTT architecture 300 of FIG. 3 can provide advantages over other NTT architectures. By using a single memory block 302, NTT architecture 300 can provide cost savings and more area efficiency on a substrate die than architectures which use two or more memory blocks. As it can be challenging to provide correct inputs from a single memory block to the radix-4 butterfly unit or the two parallel radix-2 butterfly units, read address permutation generator 303 and write address permutation generator 301 are configured to perform serial permutations, and commutator stage 304 is configured to perform a parallel permutation. Further, first commutator layer 306 and a second commutator layer 308 comprise a varying delay in depths. This allows four different coefficients to be received at the correct stride, enabling the use of a radix-4 butterfly unit or 2-by-1 radix-2 butterfly units.

To perform an NTT, data is read, processed, and written in an iterative manner using NTT architecture 300. First, NTT architecture 300 can receive data (e.g., coefficients) related to an NTT computation and write the data to memory block 302. Further, NTT architecture 300 may be controlled to perform an NTT for a CRYSTALS-Dilithium algorithm or an NTT for a CRYSTALS-Kyber algorithm. As mentioned above, CRYSTALS-Kyber and CRYSTALS-Dilithium use prime moduli with different bit lengths—CRYSTALS-Dilithium uses a 23-bit prime modulus and CRYSTALS-Kyber uses a 12-bit prime modulus. For example, in a 256-point NTT for a CRYSTALS-Dilithium algorithm, 96 bits of data—comprising four 23-bit coefficients—are read in each clock cycle. Correspondingly, each of the four NTT iterations requires 256/4 clock cycles to read all coefficients. For two 128-point NTTs for a CRYSTALS-Kyber algorithm, the 96 bits of data read comprise eight 12-bit coefficients.

Within an NTT computation, each iteration comprises providing inputs of values from memory block 302 to the commutator stage 304, outputting commutator stage results from commutator stage 304 to butterfly stage 310, and outputting butterfly stage results as updated values. The updated values are written to memory block 302 after each iteration. After the fourth iteration, the results of the NTT are output, for example, for use in a CRYSTALS-Dilithium algorithm or CRYSTALS-Kyber algorithm. By using a radix-4 butterfly unit, NTT computations can be faster and more efficient than other implementations which omit radix-4 butterfly units. This can help achieve higher throughput for lattice-based cryptographic systems. Therefore, a 2-by-1 arrangement of radix-2 butterfly units is instantiated when needed, such as during the fourth pass of data through the architecture for CRYSTALS-Kyber algorithms.

Figure 4:
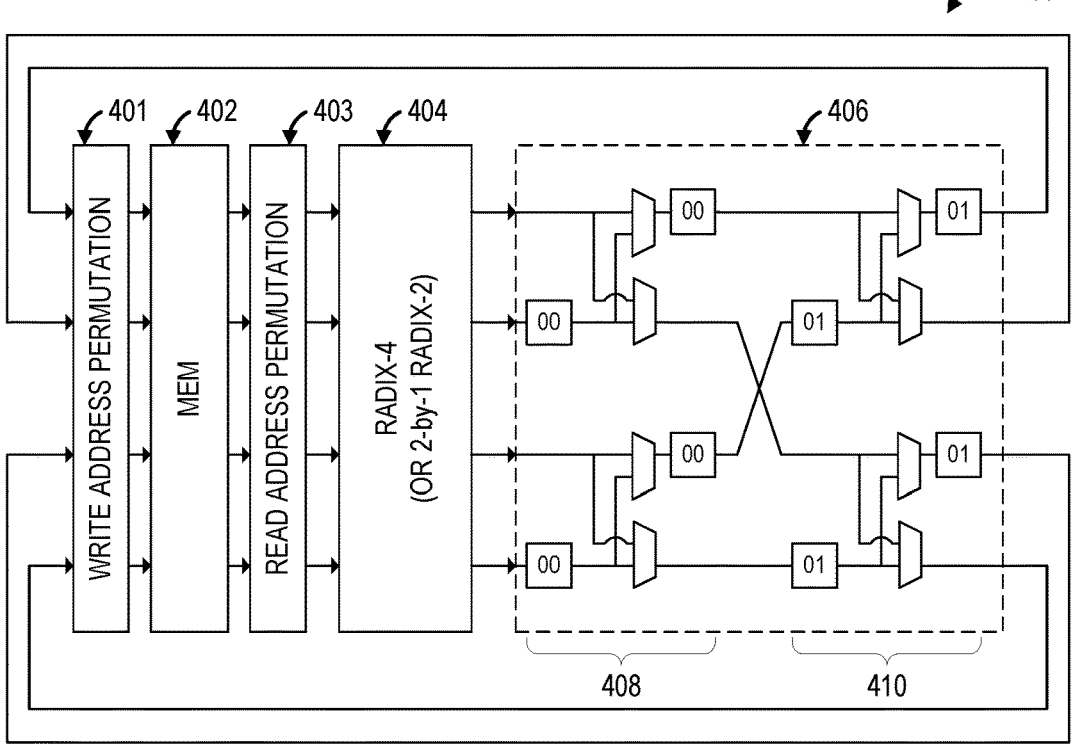
FIG. 4 schematically shows an architecture adapted for an inverse NTT (INTT) computation, with the commutator stage relocated ahead of memory for a write address permutation.

In the context of polynomial multiplication, both the forward and inverse NTT computations are used. As such, examples also are disclosed for adapting the forward NTT technique for use in computing INTTs. FIG. 4 schematically shows an example INTT architecture 400 adapted for an inverse NTT computation with the commutator stage relocated ahead of memory. INTT architecture 400 can be implemented as a hardware device, and can be used for performing INTT computations for lattice-based cryptographic schemes, including CRYSTALS-Kyber and CRYSTALS-Dilithium.

INTT architecture 400 comprises a write address permutation generator 401, a memory block 402, and a read address permutation generator 403. INTT architecture 400 further comprises a butterfly stage 404 connected to the memory block. Butterfly stage 404 comprises a radix-4 butterfly unit or a 2-by-1 arrangement of radix-2 butterfly units based on the chosen algorithm and the iteration being executed. Multiplexer toggling can be used to control butterfly stage 404 to operate as a radix-4 butterfly unit or a 2-by-1 arrangement of radix-2 butterfly units. INTT architecture 400 further comprises a commutator stage 406 connected to output from butterfly stage 404. Commutator stage 406 comprises a first commutator layer 408 and a second commutator layer 410. Values output from commutator stage 406 are output to write address permutation generator 401 for writing to memory block 402.

First commutator layer 408 and a second commutator layer 410 comprise a varying delay in depths. In contrast to NTT architecture 300, commutator stage 406 is located before memory block 402. As described above, read address permutation generator 403 is configured to perform a serial permutation and commutator stage 406 is configured to perform a parallel permutation. This allows four different coefficients to be received at the correct stride, enabling the use of a radix-4 butterfly unit or 2-by-1 arrangement of radix-2 butterfly units. Further, by using a single memory block 402, INTT architecture 400 can provide cost savings and more area efficiency than examples that use two or more memory blocks. In some examples, additional multiplexers (not shown for clarity) can be included to switch between NTT and INTT configurations at runtime. For example, multiplexers can be toggled to connect the output of butterfly stage 310 to commutator stage 304. As such, multiplexers can be used to adapt NTT architecture 300 into INTT architecture 400 by changing the order of processing blocks.

Figure 5:
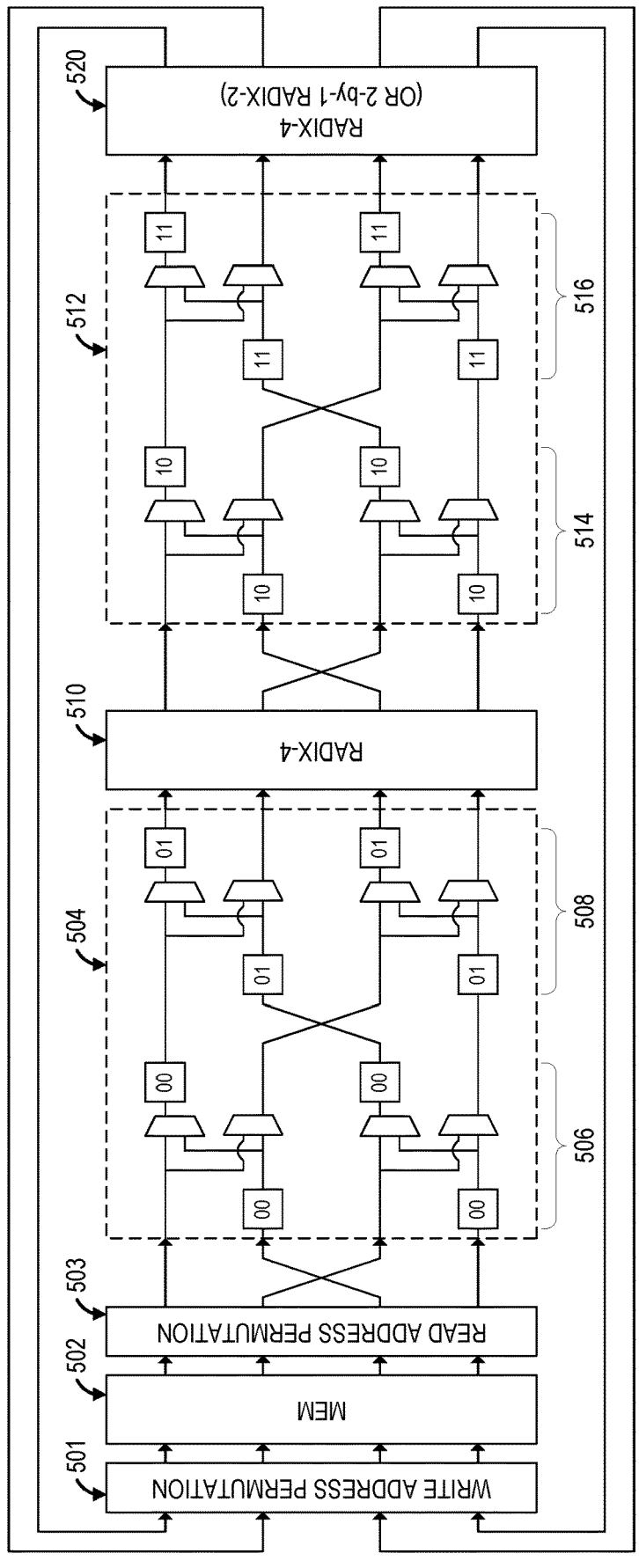
FIG. 5 schematically shows an example NTT architecture comprising two pipelined butterfly units.

FIG. 5 schematically shows an example NTT architecture 500 that can be used for various lattice-based cryptographic schemes, including CRYSTALS-Kyber and CRYSTALS-Dilithium. NTT architecture 500 can be implemented as a hardware device. For CRYSTALS-Dilithium, NTT architecture 500 includes two pipelined radix-4 butterfly units. For CRYSTALS-Kyber, NTT architecture 500 includes a radix-4 butterfly unit for the first stage and either a radix-4 or a 2-by-1 radix-2 butterfly unit based on the iteration being executed. Here, each stage passes processed data forward to the next stage in a feedforward architecture. The feedforward architecture is an example of a multi-path delay commutator (MDC) architecture. By including two radix-4 butterfly units in an MDC architecture, NTT architecture 500 fetches coefficients less frequently than other architectures. This can provide better hardware-efficiency than architectures which include fewer butterflies. Further, by using a single memory block, NTT architecture 500 can provide lower cost than examples that use two or more memory blocks.

NTT architecture 500 comprises a write address permutation generator 501, a memory block 502, and a read address permutation generator 503 configured to read input values from the memory block. NTT architecture 500 further comprises a first commutator stage 504. First commutator stage 504 comprises a first commutator layer 506 and a second commutator layer 508. NTT architecture 500 further comprises a first butterfly stage 510 comprising a radix-4 butterfly unit connected to output of the first commutator stage 504.

NTT architecture 500 further comprises a second commutator stage 512 connected to output from the first butterfly stage 510. Second commutator stage 512 comprises a third commutator layer 514 and a fourth commutator layer 516. NTT architecture 500 further comprises a second butterfly stage 520. Multiplexer toggling can be used to control second butterfly stage 520 to operate as a radix-4 butterfly unit or a 2-by-1 arrangement of radix-2 butterfly units based on the iteration and chosen algorithm. For example, when performing a CRYSTALS-Kyber algorithm, second butterfly stage 520 operates as a radix-4 butterfly unit for the first pass of data through the architecture, and as a 2-by-1 arrangement of radix-2 butterfly units for the second pass of data through the architecture. When performing a CRYSTALS-Dilithium algorithm, second butterfly stage 520 operates as a radix-4 butterfly unit for both passes of data through the architecture. In some examples, second butterfly stage 520 can be entirely replaced by a 2-by-1 arrangement of radix-2 butterfly units. This can be useful for schemes where the polynomial size is a power of 8 (e.g., 8, 64, 512).

As described above with regard to FIG. 3, data is read, processed, and written in an iterative manner using NTT architecture 500. In a 256-point NTT for a CRYSTALS-Dilithium algorithm, 96 bits of data—comprising four 23-bit coefficients—are read in each clock cycle. Correspondingly, each of the two NTT iterations requires 256/4 clock cycles to read all coefficients. For two 128-point NTTs for a CRYSTALS-Kyber algorithm, the 96 bits of data read comprise eight 12-bit coefficients. While NTT architecture 300 uses four iterations to perform an NTT computation, NTT architecture 500 uses two iterations. This is because NTT architecture 500 comprises twice as many butterfly units as NTT architecture 300.

Within an NTT computation, each iteration comprises providing inputs of values from memory block 502 to first commutator stage 504. The iteration further comprises outputting commutator stage results from first commutator stage 504 to first butterfly stage 510. The iteration further comprises outputting butterfly stage results from first butterfly stage 510 to second commutator stage 512. The iteration further comprises outputting commutator stage results from second commutator stage 512 to second butterfly stage 520. The iteration further comprises outputting results from second butterfly stage 520 as updated values. The updated values are written to memory block 502 after each iteration. After the second iteration, the results of the NTT are output, e.g., for use in a CRYSTALS-Dilithium algorithm or CRYSTALS-Kyber algorithm. By using radix-4 butterfly units, NTT computations can be faster and more efficient than implementations which use radix-2 butterfly units. Further, the results from first butterfly stage 510 are passed in a feedforward architecture to second butterfly stage 520 without accessing memory in between. Thus, two radix-4 butterflies are performed between memory accesses. This helps provide greater area efficiency than examples that use fewer butterflies and/or include radix-2 butterfly units. This also can help achieve higher throughput for lattice-based cryptographic systems.

NTT architectures, including NTT architecture 500, can be controlled to perform an NTT or INTT computation. For example, the order of processing blocks can be changed via processing elements to adapt the NTT architecture for an INTT computation, as described in more detail below with regard to FIG. 6. Further, various processing elements of the NTT architecture can be toggled via control elements to adapt the NTT architecture for performing either an NTT or an INTT. For example, when performing INTT computations, butterflies introduce a factor of 2. This is accounted for by including ½ multipliers in the radix-4 (or radix-2) butterfly units. As such, in the case of INTT computations, control elements can control the butterfly units to pass data to the ½ multipliers. On the other hand, in the case of NTT computations, the control elements control the butterfly units to bypass the ½ multipliers.

Figure 6:
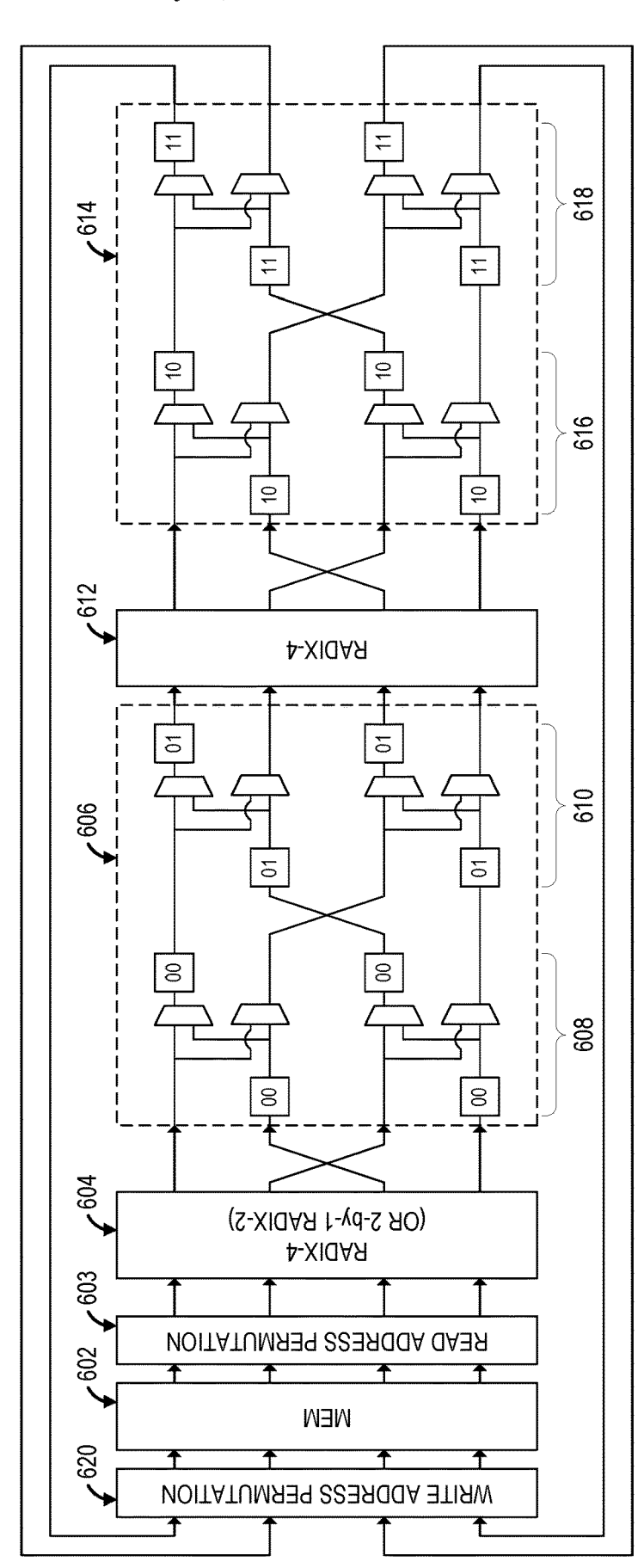
FIG. 6 schematically shows an example INTT architecture comprising two pipelined butterfly units.

FIG. 6 shows an example INTT architecture 600 that can be used for CRYSTALS-Dilithium and CRYSTALS-Kyber applications. For CRYSTALS-Dilithium, the NTT architecture includes two pipelined radix-4 butterfly units. In the case of CRYSTALS-Kyber, the NTT architecture includes either a radix-4 butterfly unit or a 2-by-1 arrangement of radix-2 butterfly units for the first stage, depending on the iteration being executed, and a radix-4 butterfly unit for the second stage. INTT architecture 600 can be implemented as a hardware device. INTT architecture 600 is configured for INTT computations. INTT architecture 600 shares processing blocks with NTT architecture 500. As discussed above, the order of processing blocks can be changed via processing elements to adapt, e.g., NTT architecture 500 to INTT architecture 600.

INTT architecture 600 comprises a write address permutation generator 601, a memory block 602, and a read address permutation generator 603 configured to read inputs of values from the memory block. INTT architecture 600 further comprises a first butterfly stage 604. First butterfly stage 604 is configured to operate as a radix-4 butterfly unit for CRYSTALS-Dilithium algorithm. For CRYSTALS-Kyber algorithms, first butterfly stage 604 operates as a radix-4 butterfly unit for the first pass of data through the architecture, and as a 2-by-1 arrangement of radix-2 butterfly units for the second pass of data through the architecture. INTT architecture 600 further comprises a first commutator stage 606 connected to output of the first butterfly stage 604. First commutator stage 606 comprises a first commutator layer 608 and a second commutator layer 610.

INTT architecture 600 further comprises a second butterfly stage 612 comprising a radix-4 butterfly unit connected to output of the first commutator stage 606. INTT architecture 600 further comprises a second commutator stage 614 connected to output from the second butterfly stage 612. Second commutator stage 614 comprises a third commutator layer 616 and a fourth commutator layer 618.

Figures 7, 8:
FIG. 7 shows a table that lists example depth values used at the different commutator layers of the NTT architecture of FIG. 5.
FIG. 8 shows a table that lists example depth values used at the different commutator layers for the INTT architecture of FIG. 6.

The commutator layers shown in FIGS. 5-6 comprise a varying delay in depths that is dependent on the algorithm. FIG. 7 shows a table 700 with example depth values for different stages of NTT architecture 500 using different algorithms. Column 702 indicates the algorithm (either CRYSTALS-Dilithium or CRYSTALS-Kyber) and column 704 indicates the iteration. Column 706 ("Depth_00") indicates the depth value used at first commutator layer 506. Column 708 ("Depth_01") indicates the depth value used at second commutator layer 508. Column 710 ("Depth_10") indicates the depth value used at third commutator layer 514. Finally, column 712 ("Depth_11") indicates the depth value used at fourth commutator layer 516. As seen in FIG. 7, depth values for CRYSTALS-Dilithium are 8, 4, 2, 1 for both the first and second iterations. For CRYSTALS-Kyber, depth values are 8, 4, 2, 1 for the first iteration and 4, 2, 1, 0 for the second iteration. In other examples, depth values for the commutator layers can be different from those shown in table 700.

FIG. 8 shows a table 800 with example depth values for different stages of INTT architecture 600 using different algorithms. Column 802 indicates the algorithm (either CRYSTALS-Dilithium or CRYSTALS-Kyber) and column 804 indicates the iteration. Column 806 ("Depth_00") indicates the depth value used at first commutator layer 608. Column 808 ("Depth_01") indicates the depth value used at second commutator layer 610. Column 810 ("Depth_10") indicates the depth value used at third commutator layer 616. Finally, column 812 ("Depth_11") indicates the depth value used at fourth commutator layer 618. In other examples, depth values for the commutator layers can be different from those shown in table 800.

As mentioned above, memory addressing issues can be challenging for radix-4 architectures. These memory addressing issues are further complicated when reducing the memory to a single memory block. NTT architecture 500 can avoid the bit-reversed operation for DIT NTT and DIF INTT by employing an algorithm for generating read addresses and write addresses. This algorithm works together with the commutator stages to produce input values at correct strides. In memory-based NTTs, data is reordered at each iteration. As such, the read/write address permutation generators are configured to perform bit-dimension permutations. For $N=2^n$ data, the position of each data can be expressed as $(a_{n-1}, a_{n-2}, \ldots, a_1, a_0)$ where each $a_n$ represents a bit of the address. In this context, a bit-dimension permutation can operate on a bit address a to generate a new address a'.

Figure 9:
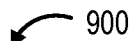
FIG. 9 shows a table that lists formulas for generating read and write addresses for NTT/INTT methods for CRYSTALS-Kyber and CRYSTALS-Dilithium.

FIG. 9 shows a table 900 with formulas for an example address generating algorithm. The address generating algorithm depends on the cryptographic scheme used, the iteration, whether NTT or INTT computations are being performed, and whether a read address or write address is being generated. CRYSTALS-Dilithium uses a 6-bit address and CRYSTALS-Kyber uses a 5-bit address.

As mentioned above, write address permutation generators 301, 401, 501, and 601 are configured to generate write addresses. Additionally, read address permutation generators

303, 403, 503, and 603 are configured to generate read addresses. For example, in the first iteration of a CRYS-TALS-Dilithium, the NTT read address is generated using the formula "230154" which generates a bit-dimension permutation of $a_5$, $a_4$, $a_3$, $a_2$, $a_1$, $a_0 \rightarrow a_2$, $a_3$, $a_0$, $a_1$, $a_5$, $a_4$, where the numbers in the formula correspond to the subscripts in the target address. Similarly, in the first iteration of a CRYSTALS-Dilithium, the NTT read address is generated using the formula "23014" which generates a bit-dimension permutation of $a_4$, $a_3$, $a_2$, $a_1$, $a_0 \rightarrow a_2$, $a_3$, $a_0$, $a_1$, $a_4$.

Figure 10:
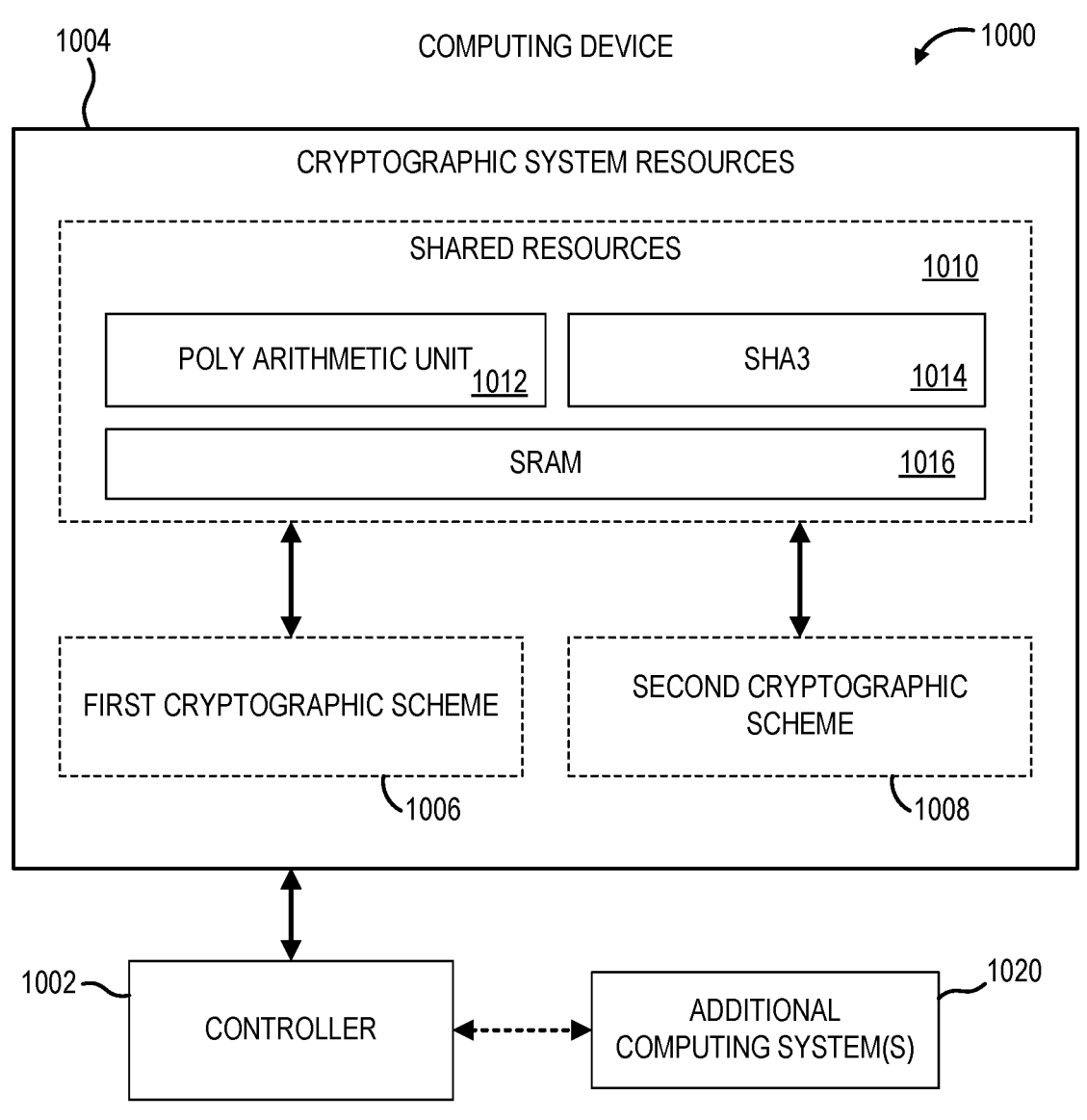
FIG. 10 schematically shows a block diagram of a computing device comprising a Polynomial Arithmetic Unit as part of a system-on-chip (SoC) for module lattice-based cryptographic systems.

NTT/INTT architectures 300, 400, 500, and 600 can be incorporated into a polynomial arithmetic unit of a computing device. FIG. 10 schematically shows an example computing device 1000 that includes hardware configured to perform cryptographic tasks associated with CRYSTALS-Kyber algorithms and CRYSTALS-Dilithium algorithms. Computing device 1000 comprises a controller 1002 and cryptographic system resources 1004. Controller 1002 is configured to control various components of computing device 1000, including cryptographic system resources 1004.

Computing system 1000 comprises a first module 1006 configured for performing tasks associated with a first cryptographic scheme. Computing system 1000 further comprises a second module 1008 configured for performing tasks associated with a second cryptographic scheme. Example cryptographic schemes include CRYSTALS-Kyber and CRYSTALS-Dilithium.

Computing system 1000 further comprises shared resources 1010. Shared resources 1010 comprises modules that can be used for both first and second cryptographic schemes. Shared resources 1010 comprises a Polynomial Arithmetic Unit 1012 configure for performing polynomial addition, subtraction, and multiplication. Shared resources 1010 further comprises a Secure Hash Algorithm 3 (SHA3) module 1014 and a Static Random Access Memory (SRAM) module 1016. In some examples, SRAM module 1016 can be used as a memory block, e.g., memory block 302, memory block 402, or memory block 502.

Polynomial Arithmetic Unit 1012 is used to perform NTT and/or INTT computations. Polynomial Arithmetic Unit 1012 can comprise one or more circuits configured for NTT computations, such as NTT architecture 300, INTT architecture 400, NTT architecture 500, and INTT architecture 600. As mentioned above, NTT and INTT computations account for a significant portion of the computational cost in lattice based cryptographic systems. Together, Polynomial Arithmetic Unit 1012, SHA3 module 1014, and SRAM module 1016 are more resource-intensive than other modules within computing device 1000. By including hardware adapted for CRYSTALS-Kyber and CRYSTALS-Dilithium applications, such as the architecture described above with regard to FIGS. 3-6, Polynomial Arithmetic Unit 1012 can be shared between modules configured for CRYSTALS-Kyber and/or CRYSTALS-Dilithium applications. For example, first module 1006 can be configured for CRYS-TALS-Kyber applications and second module 1008 can be configured for CRYSTALS-Dilithium applications.

Computing system 1000 can communicate with one or more additional computing systems 1020. For example, computing system 1000 can comprise a dedicated cryptographic chip (e.g., root-of-trust) for performing cryptographic tasks for computing system 1020. In some examples, computing system 1000 may be incorporated into computing system 1020. In some examples, computing system 1000 may be located remote to one or more additional computing system 1020. Example computing systems are discussed in more detail below with regard to FIG. 12.

FIG. 11 shows a flow diagram for an example method 1100 for performing an NTT for a module lattice-based cryptographic algorithm. Examples include CRYSTALS-Kyber and CRYSTALS-Dilithium. Method 1100 can be performed using any suitable architecture, such as NTT architecture 300 or NTT architecture 500.

At 1102, method 1100 comprises inputting values from a memory block into a commutator stage, the commutator stage comprising a first commutator layer and a second commutator layer. A read/write address generator, as well as a commutator stage is used for data permutation. In some examples, the first commutator layer and the second commutator layer comprise different values in depth. In some examples, the values for depth depend on the type of cryptographic algorithm used. Examples of depth values that can be used at different commutator layers for different algorithms are described above with regard to FIG. 6.

Continuing, at 1104, method 1100 further comprises outputting commutator stage results from the commutator stage to a butterfly stage comprising a radix-4 butterfly unit. Use of a radix-4 butterfly unit can provide cost savings and area efficiency compared to implementations that use radix-2 butterfly units.

Method 1100 further comprises, at 1106, outputting butterfly stage results from the butterfly stage as updated values. In some examples, at 1108, outputting butterfly stage results comprises outputting the butterfly stage results from the butterfly stage to the memory block as updated values, and the inputting values, the outputting commutator stage results, and the outputting butterfly stage results are a first iteration, and the method further comprises iteratively inputting the updated values into commutator stage, outputting updated commutator stage results to the butterfly stage, and outputting updated butterfly stage results to the memory block for an additional three iterations. For example, NIT architecture 300 of FIG. 3 can be used to perform an NIT computation via four such iterations.

In some examples, the commutator stage is a first commutator stage, the butterfly stage is a first butterfly stage, and method 1100 further comprises, at 1110, outputting butterfly results from the first butterfly stage to a second commutator stage, the second commutator stage comprising a third commutator layer and a fourth commutator layer. In such examples, the method further comprises, at 1112, outputting commutator stage results from the second commutator stage to a second butterfly stage. In some examples, the second butterfly stage of a first iteration compromises a radix-4 butterfly unit, while the second butterfly stage of a second iteration comprises two parallel radix-2 butterfly units. This can be used for performing CRYSTALS-Kyber algorithm. In other examples, the second butterfly stage of both iterations comprises a radix-4 butterfly unit. This can be used for performing CRYSTALS-Dilithium algorithm. In such examples, the method further comprises, at 1114, outputting butterfly stage results from the second butterfly stage to the memory block as updated values. A write address permutation generator can be used for writing output values to the memory block. In some examples, at 1116, the inputting at 1102, the outputting at 1104, the outputting at 1106, the outputting at 1110, the outputting at 1112, and the outputting at 1114 are a first iteration, and method 1100 further comprises performing a second iteration.

In some examples, at 1118, method 1100 comprises generating a 6-bit read address using as, $a_4$, $a_3$, $a_2$, $a_1$, $a_0 \rightarrow a_2$, $a_3$, $a_0$, $a_1$, $a_5$, $a_4$. This can be used for generating an NTT read address for a CRYSTALS-Dilithium algorithm, for example. In some examples, at 1120, method 1100 comprises generating a 5-bit read address using $a_4$, $a_3$, $a_2$, $a_1$, $a_0 \rightarrow a_2$, $a_3$, $a_0$, $a_1$, $a_4$. This can be used for generating an NTT read address for a first iteration of a CRYSTALS-Kyber algorithm, for example. Address generating algorithms for read/write addresses for NTT and INTT computations are discussed in more detail above with regard to FIG. 9.

In some embodiments, the methods and processes described herein may be tied to a computing system of one or more computing devices. In particular, such methods and processes may be implemented as a computer-application program or service, an application-programming interface (API), a library, and/or other computer-program products.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1202 executing instructions held by storage machine 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a device for performing a NTT for a lattice-based cryptographic algorithm. The device comprises a memory block, a read address permutation generator configured to read input values from the memory block, a commutator stage comprising a first commutator layer and a second commutator layer, a butterfly stage connected to output of the commutator stage, the butterfly stage comprising a radix-4 butterfly unit, and a write address permutation generator configured to write output values to the memory block. In some such examples, the commutator stage is a first commutator stage, the butterfly stage is a first butterfly stage, and the device further comprises a second commutator stage connected to output of the first butterfly stage, the second commutator stage comprising a third commutator layer and a fourth commutator layer, and a second butterfly stage connected to output from the second commutator stage. In some such examples, the second butterfly stage comprises a 2-by-1 arrangement of radix-2 butterfly units or a second radix-4 butterfly unit. Additionally or alternatively, in some such examples, the device further comprises multiplexers, and the device is configured to perform an INTT by toggling the multiplexers to connect the output of the butterfly stage to the commutator stage. Additionally or alternatively, in some such examples, the device is configured to perform an NTT for a CRYSTALS-Kyber algorithm and an NTT for a CRYSTALS-Dilithium algorithm. Additionally or alternatively, in some such examples, the first commutator layer and the second commutator layer comprise a varying delay in depths. Additionally or alternatively, in some such examples, the read address permutation generator is configured to perform a read address permutation, and the write address permutation generator is configured to perform a write address permutation. Additionally or alternatively, in some such examples, the device is configured for a 256-point radix-4 NTT for a CRYSTALS-Dilithium algorithm and two 128-point radix-4 NTT for a CRYSTALS-Kyber algorithm. Additionally or alternatively, in some such examples, the commutator stage is configured to read 96 bits of data from the memory block.

Another example provides a method of performing NTT for a lattice-based cryptographic algorithm. The method comprises inputting values from a memory block into a commutator stage, the commutator stage comprising a first commutator layer and a second commutator layer, outputting commutator stage results from the commutator stage to a butterfly stage comprising a radix-4 butterfly unit, and outputting butterfly stage results from the butterfly stage as updated values. In some such examples, outputting butterfly stage results comprises outputting the butterfly stage results from the butterfly stage to the memory block as updated values, wherein the inputting values, the outputting commutator stage results, and the outputting butterfly stage results are a first iteration, and wherein the method further comprising iteratively inputting the updated values into commutator stage, outputting updated commutator stage results to the butterfly stage, and outputting updated butterfly stage results to the memory block for an additional three iterations. Additionally or alternatively, in some such examples, the commutator stage is a first commutator stage, the butterfly stage is a first butterfly stage, and the method comprises outputting the butterfly stage results from the first butterfly stage to a second commutator stage, the second commutator stage comprising a third commutator layer and a fourth commutator layer, outputting second commutator stage results from the second commutator stage to a second butterfly stage, and outputting second butterfly stage results from the second butterfly stage to the memory block as updated values. Additionally or alternatively, in some such examples, the method further comprises iteratively inputting the updated values into commutator stage, outputting updated commutator stage results to the butterfly stage, and outputting updated butterfly stage results to the memory block for an additional iteration to perform an NTT. Additionally or alternatively, in some such examples, inputting values from the memory block into the first commutator stage comprises generating a 6-bit read address using $a_5$, $a_4$, $a_3$, $a_2$, $a_1$, $a_0 \rightarrow a_2$, $a_3$, $a_0$, $a_1$, $a_5$, $a_4$. Additionally or alternatively, in some such examples, inputting values from the memory block into the first commutator stage comprises generating a 5-bit read address using $a_4$, $a_3$, $a_2$, $a_1$, $a_0 \rightarrow a_2$, $a_3$, $a_0$, $a_1$, $a_4$.

Another example provides a device for performing a NTT for a lattice-based cryptographic algorithm. The device comprises a memory bank, a read address permutation generator configured to read input values from the memory bank, a first commutator stage comprising a first commutator layer and a second commutator layer, a first butterfly stage connected to output of the first commutator stage, the first butterfly stage comprising a radix-4 butterfly unit, a second commutator stage connected to output of the first butterfly stage, the second commutator stage comprising a third commutator layer and a fourth commutator layer, a second butterfly stage connected to output of the second commutator stage, the second butterfly stage comprising one of a parallel arrangement of radix-2 butterfly units or a radix-4 butterfly unit, and a write address permutation generator configured to write output values to the memory bank. In some such examples, the memory bank comprises a single memory block. Additionally or alternatively, in some such examples, the first commutator layer, the second commutator layer, the third commutator layer, and the fourth commutator layer comprise a varying delay in depths. Additionally or alternatively, in some such examples, the device further comprises multiplexers, and the device is further configured to perform an INTT by toggling the multiplexers to connect the output of the second butterfly stage to the second commutator stage, connect the output of the second commutator stage to the first butterfly stage, and connect the output of the first butterfly stage to the first commutator stage. Additionally or alternatively, in some such examples, the device is configured to perform an NTT for a CRYSTALS-Dilithium algorithm, and further is configured to perform an NTT for a CRYSTALS-Kyber algorithm.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device for performing a number-theoretic transform (NTT) for a lattice-based cryptographic algorithm, the device comprising:
a single memory block;
a read address permutation generator configured to read input values from the single memory block, perform serial permutations on the read input values, and provide read result values to a commutator stage;
the commutator stage configured to perform a parallel permutation on the read result values from the read address permutation generator, wherein:
the commutator stage comprises a first commutator layer and a second commutator layer, and
the first commutator layer has a first depth value and the second commutator layer has a second depth value, each configured with delay elements to deliver commutator result values from the second commutator layer to a butterfly stage at a correct stride;
the butterfly stage comprising a radix-4 butterfly unit configured to process the commutator result values from the second commutator layer to generate butterfly result values; and
a write address permutation generator configured to perform serial permutations on the butterfly result values to generate output values and write the output values to the single memory block.

2. The device of claim 1, wherein the commutator stage is a first commutator stage, and the butterfly stage is a first butterfly stage, the device further comprising:
a second commutator stage connected to an output of the first butterfly stage, the second commutator stage comprising a third commutator layer and a fourth commutator layer; and
a second butterfly stage connected to an output from the second commutator stage.

3. The device of claim 2, wherein the second butterfly stage comprises a 2-by-1 arrangement of radix-2 butterfly units, or a second radix-4 butterfly unit.

4. The device of claim 1, further comprising multiplexers, and wherein the device is configured to perform an inverse NTT (INTT) by toggling the multiplexers to connect the output of the butterfly stage to the commutator stage.

5. The device of claim 1, wherein the device is configured to perform an NTT for a CRYSTALS-Kyber algorithm and an NTT for a CRYSTALS-Dilithium algorithm.

6. The device of claim 1, wherein the first depth value is two times the second depth value.

7. The device of claim 1, wherein the read address permutation generator is configured to perform a read address permutation, and the write address permutation generator is configured to perform a write address permutation.

8. The device of claim 1, wherein the device is configured for a 256-point radix-4 NTT for a CRYSTALS-Dilithium algorithm and two 128-point radix-4 NTT for a CRYSTALS-Kyber algorithm.

9. The device of claim 1, wherein the commutator stage is configured to read 96 bits of data from the single memory block.

10. A method of performing number-theoretic transform (NTT) for a lattice-based cryptographic algorithm, the method comprising:
inputting values from a single memory block into a commutator stage, the commutator stage configured to perform a parallel permutation on the values and the commutator stage comprising a first commutator layer having a first depth value and a second commutator layer having a second depth value, wherein the first commutator layer and the second commutator layer are each configured with delay elements to deliver commutator stage results from the second commutator layer to a butterfly stage at a correct stride;
outputting the commutator stage results from the commutator stage to the butterfly stage comprising a radix-4 butterfly unit; and
outputting butterfly stage results from the butterfly stage as updated values.

11. The method of claim 10, wherein outputting the butterfly stage results comprises outputting the butterfly stage results from the butterfly stage to the single memory block as updated values, wherein the inputting values, the outputting the commutator stage results, and the outputting the butterfly stage results are a first iteration, and wherein the method further comprising iteratively inputting the updated values into the commutator stage, outputting updated commutator stage results to the butterfly stage, and outputting updated butterfly stage results to the single memory block for an additional three iterations.

12. The method of claim 10, wherein the commutator stage is a first commutator stage, the butterfly stage is a first butterfly stage, and the method further comprises:
outputting the butterfly stage results from the first butterfly stage to a second commutator stage, the second commutator stage comprising a third commutator layer and a fourth commutator layer;
outputting second commutator stage results from the second commutator stage to a second butterfly stage; and
outputting second butterfly stage results from the second butterfly stage to the single memory block as updated values.

13. The method of claim 12, wherein the method further comprises iteratively inputting the updated values into the commutator stage, outputting updated commutator stage results to the butterfly stage, and outputting updated butterfly stage results to the single memory block for an additional iteration to perform an NTT.

14. The method of claim 12, wherein inputting values from the single memory block into the first commutator stage comprises generating, by a read address permutation generator, a 6-bit read address using:
$a_5, a_4, a_3, a_2, a_1, a_0 \rightarrow a_2, a_3, a_0, a_1, a_5, a_4$.

15. The method of claim 12, wherein inputting values from the single memory block into the first commutator stage comprises generating, by a read address permutation generator, a 5-bit read address using:
$a_4, a_3, a_2, a_1, a_0 \rightarrow a_2, a_3, a_0, a_1, a_4$.

16. A device for performing a number-theoretic transform (NTT) for a lattice-based cryptographic algorithm, the device comprising:
a single memory block;
a read address permutation generator configured to read input values from the single memory block, perform serial permutations on the read input values, and provide read result values to a first commutator stage;
the first commutator stage configured to perform a parallel permutation on the read result values from the read address permutation generator, wherein:
the first commutator stage comprises a first commutator layer and a second commutator layer, and the first commutator layer has a first depth value and the second commutator layer has a second depth value, each configured with delay elements to deliver commutator result values from the second commutator layer to a first butterfly stage at a correct stride;

the first butterfly stage connected to an output of the first commutator stage, the first butterfly stage comprising a radix-4 butterfly unit;

a second commutator stage connected to an output of the first butterfly stage, the second commutator stage comprising a third commutator layer and a fourth commutator layer;

a second butterfly stage connected to output of the second commutator stage, the second butterfly stage comprising one of a parallel arrangement of radix-2 butterfly units or a radix-4 butterfly unit; and a write address permutation generator configured to write output values to the single memory block.

17. The device of claim 16, wherein the first commutator stage is configured to read 96 bits of data from the single memory block.

18. The device of claim 16, wherein the first depth value is two times the second depth value.

19. The device of claim 16, further comprising multiplexers, and wherein the device is further configured to perform an inverse NTT (INTT) by toggling the multiplexers to connect the output of the second butterfly stage to the second commutator stage, connect the output of the second commutator stage to the first butterfly stage, and connect the output of the first butterfly stage to the first commutator stage.

20. The device of claim 16, wherein the device is configured to perform an NTT for a CRYSTALS-Dilithium algorithm, and further is configured to perform an NTT for a CRYSTALS-Kyber algorithm.

* * * * *